(12) United States Patent
Derckx et al.

(10) Patent No.: US 7,466,114 B2
(45) Date of Patent: Dec. 16, 2008

(54) VOLTAGE CONVERTER

(75) Inventors: Henricus Petronella Maria Derckx, Heerlen (NL); Patrick Emanuel Gerardus Smeets, Nijmegen (NL); Hermanus Johannes Effing, Nijmegen (NL); Wilhelmus Johannes Robertus Van Lier, Heerlen (NL)

(73) Assignee: DSP Group Switzerland AG, Zurich (CH)

(*) Notice: Subject to any disclaimer, the term of this patent is extended or adjusted under 35 U.S.C. 154(b) by 150 days.

(21) Appl. No.: 10/576,553

(22) PCT Filed: Oct. 19, 2004

(86) PCT No.: PCT/IB2004/052134

§ 371 (c)(1),
(2), (4) Date: Apr. 19, 2006

(87) PCT Pub. No.: WO2005/039033

PCT Pub. Date: Apr. 28, 2005

(65) Prior Publication Data

US 2007/0030617 A1    Feb. 8, 2007

(30) Foreign Application Priority Data

Oct. 21, 2003    (EP) .................................. 03103887

(51) Int. Cl.
*G05F 1/40*    (2006.01)
*G05F 1/613*    (2006.01)

(52) U.S. Cl. .................... 323/272; 323/225; 323/267

(58) Field of Classification Search ................. 323/222, 323/225, 267, 271, 272, 284, 351
See application file for complete search history.

(56) References Cited

U.S. PATENT DOCUMENTS 5,245,524 A    9/1993    Nakagawa et al.
5,617,015 A    4/1997    Goder et al.

(Continued)

FOREIGN PATENT DOCUMENTS

JP    2003 256052    12/2003

OTHER PUBLICATIONS

Kuwabara K et al: "Switched-Capacitor DC-DC Converters"; Intelec. Tenth International Telecommunications Energy Conference; Oct. 30, 1998; pp. 213-218.

*Primary Examiner*—Jessica Han
(74) *Attorney, Agent, or Firm*—Knobbe, Martens, Olson & Bear, LLP

(57) ABSTRACT

A voltage converter comprises an inductive circuit (L) for storing energy during an inductive magnetizing mode and transferring energy during an inductive demagnetizing mode. In addition the voltage converter comprises at least two non-inverting branches (12, 13, 14) for providing at least two non-inverted output voltages (Va, Vb, Vc) and an inverting branch (15) for providing an inverted output voltage. The inverting (15) and non-inverting (12, 13, 14) branches being parallely coupled to an output (10) of the inductive circuit (L). The inductive circuit being arranged to transfer energy to the inverting branch (15) and to one of the at least two non-inverting branches (12, 13, 14). Through this, the inverted voltage (Vinv) and the corresponding non-inverted output voltage (Va, Vb, Vc) of the one of the at least two non-inverting branches (12, 13, 14) are having an opposite polarity and a substantially equal magnitude.

10 Claims, 4 Drawing Sheets

U.S. PATENT DOCUMENTS

| | | |
|---|---|---|
| 5,751,139 A | 5/1998 | Jordan et al. |
| 6,437,545 B2 * | 8/2002 | Sluijs ......................... 323/222 |
| 6,636,022 B2 * | 10/2003 | Sluijs ......................... 323/222 |
| 6,900,620 B2 * | 5/2005 | Nishimori et al. ........... 323/222 |

* cited by examiner

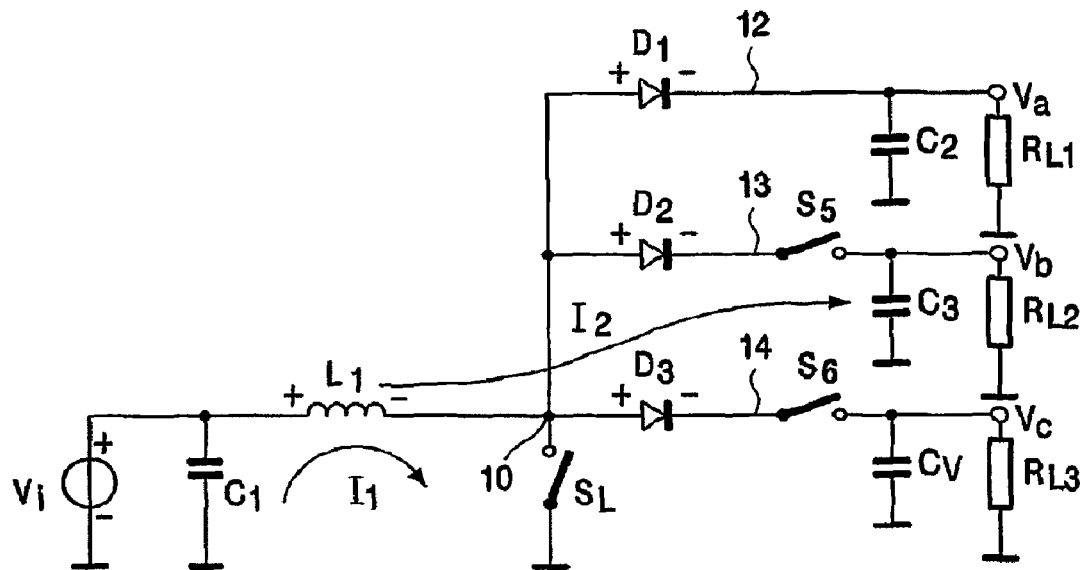
Fig.1 --PRIOR ART--
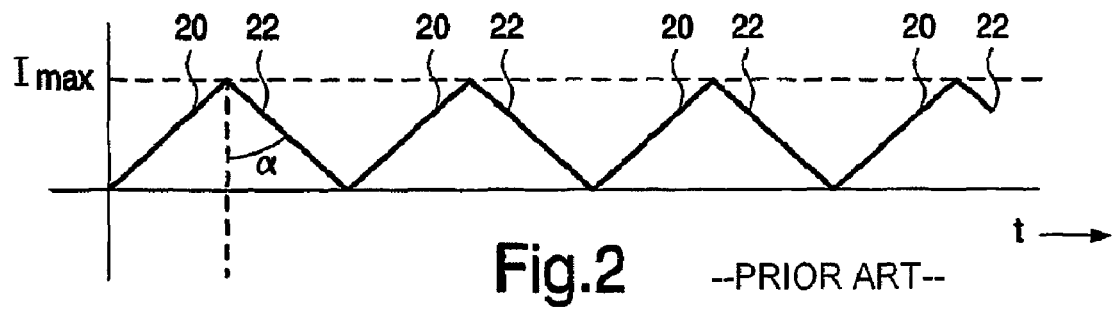
Fig.2 --PRIOR ART--
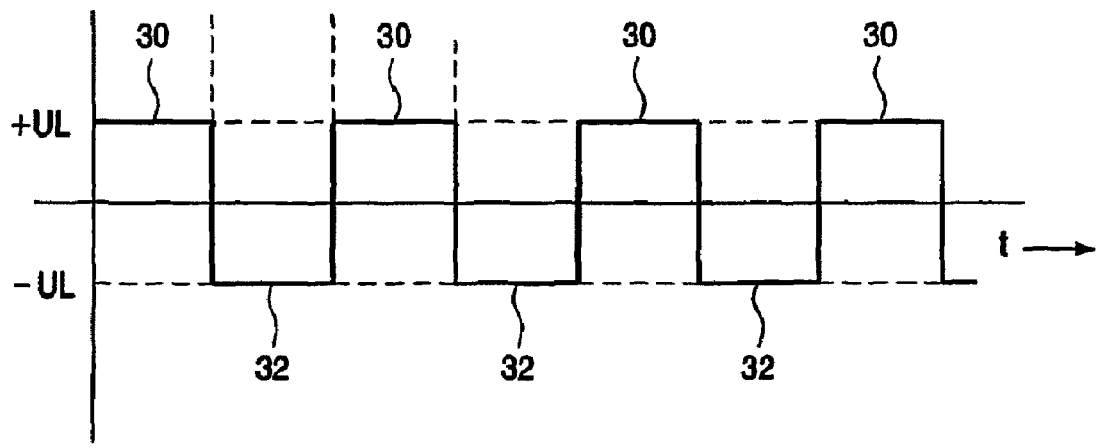
Fig.3 --PRIOR ART--

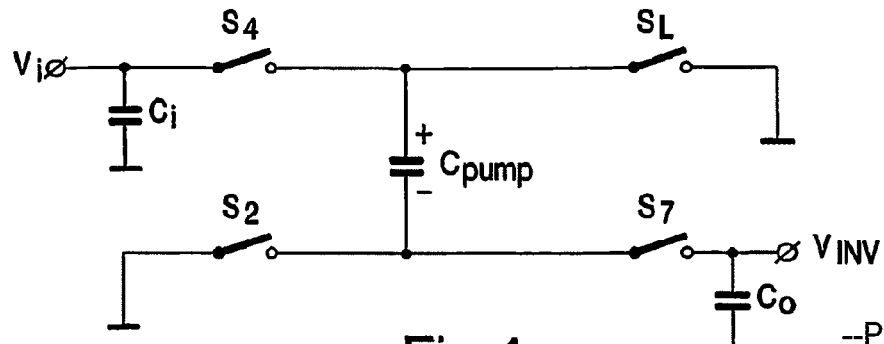
Fig.4 --PRIOR ART--
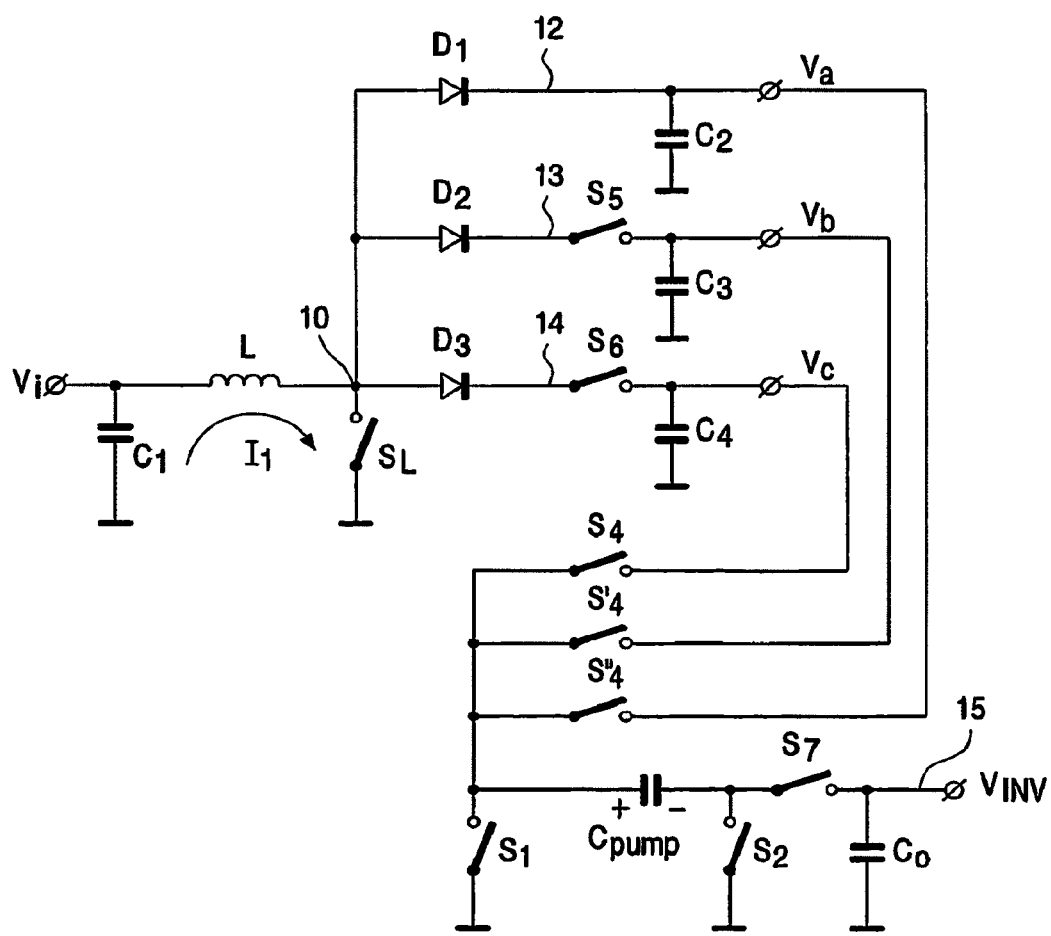
--PRIOR ART-- Fig.5

VOLTAGE CONVERTER

This invention relates to a voltage converter, a power management unit and a mobile device comprising such a voltage converter.

The present invention can be used in for example, power supplies or mobile devices such a mobile phones, Personal Digital Assistants (PDA's) or laptops. Voltage converters are generally used to derive multiple DC output voltages from a DC input voltage source. These output voltages can have a higher voltage level than the DC input voltage. Voltage converters are usually referred to as a DCDC voltage converters or Switched Mode Power Supplies (SMPS). DCDC converters are generally known in the art. A voltage converter comprises energy storing means, such as an inductor, to store energy obtained from a DC input voltage source. This energy is subsequently used to generate and sustain the multiple output voltages. The energy storing means are cyclically charged and de-charged and the flow of energy from the energy storing means to the outputs of the voltage converters is regulated by means of programmable switch devices. It is generally known in the art that also negative voltages can be provided by using an inverting circuit that is coupled to any of the outputs of the voltage converter.

It is an object of the present invention to provide an improved voltage converter. To this end the voltage converter comprises:
- an inductive circuit for storing energy during an inductive magnetizing mode and for transferring energy during an inductive de-magnetizing mode;
- at least two non-inverting branches for providing at least two non-inverted output voltages; and
- an inverting branch for providing an inverted output voltage;

the inverting and non-inverting branches being parallely coupled to an output of the inductive circuit, the inductive circuit being arranged to transfer energy to the inverting branch and to one of the at least two non-inverting branches, wherein the inverted voltage and the corresponding non-inverted output voltage of the one of the at least two non-inverting branches are having an opposite polarity and a substantially equal magnitude.

The invention is based on the insight that by coupling the inverting branch to the output of the inductive circuit rather than to the output of non-inverting branches considerable savings in required switch devices can be achieved which allows a far more efficient and more cost-effective design of a voltage converter. The invention is further based upon the insight that the output voltage of both the non-inverting and inverting branches can be determined by the voltage clamp level that is available at the output of the inductive circuit such that it is no longer not required to couple the inverting branch to the output of the non-inverting branches.

In an other embodiment of the voltage converter according to the present invention, the inverting branch comprises a capacitive circuit for storing the transferred energy during the inductive de-magnetizing mode and for releasing the transferred energy during the inductive magnetizing mode. The capacitor can advantageously act as a battery that is first charged until a required voltage level is reached and is subsequently de-charged upon request.

In an embodiment of the voltage converter according to the present invention, the capacitive circuit is arranged to receive the transferred energy through an input of the capacitive circuit while an output of the capacitive circuit is coupled to a ground voltage and wherein the capacitive circuit is being arranged to release energy through the output while the input is coupled to the ground voltage. This embodiment has the advantage that it provides a convenient way of reversing the polarity of the voltage across the capacitor.

In an other embodiment of the voltage converter according to the present invention, the voltage converter comprises first and second switch devices for respectively coupling the input (In) and the output (Out) of the capacitive circuit to the ground voltage (GND) during respectively the inductive magnetizing and de-magnetizing mode. By means of the first and switch devices, the capacitive circuit can be easily charged and de-charged in a controlled manner.

In an embodiment of the voltage converter according to the present invention the voltage converter further comprises a voltage down conversion circuit through which an input voltage is applied to the inductive circuit. Herewith, the amount of charge built-up in the inductive circuit and thus the output voltages of the voltage converter can be controlled.

In an embodiment of the voltage converter according to the present invention, the voltage down-conversion circuit comprises third and fourth switch devices for alternately applying the input voltage and a ground voltage to the inductive circuit. This embodiment has the advantage that the amount of voltage down-conversion can be determined by the duty-cycle of the third and fourth switch devices. Through this, a programmable voltage down-conversion circuit is obtained.

In an embodiment of the voltage converter according to the present invention, at least one of the at least two branches comprises a further switch device for activating the branch. By means of the further switch device, the flow of energy from the inductive circuit can be controlled. This means that only if the further switch device is closed, energy will be transferred to the branch. In addition, if the further switch device is closed, the magnitude of the clamp voltage of the inverting branch will become substantially equal to the magnitude of the clamp voltage of the activated non-inverting branch.

In another embodiment of the voltage converter according to the present invention, the voltage converter further comprises control means for controlling the switch devices. By controlling the switches it is possible to control the behavior and response of the voltage converter.

These and other aspects of the invention will be elucidated by means of the following drawings.

FIG. 1, shows a voltage converter according to the prior art.

FIG. 2, shows the magnetizing current $I_L$ through inductor L in a prior art voltage converter.

FIG. 3, shows the voltage drop $U_L$ across inductor L in a prior art voltage converter.

FIG. 4, shows a capacitive DCDC invertor.

FIG. 5, shows a voltage converter comprising a capacitive DCDC inverter according to the prior art.

Figure 6:
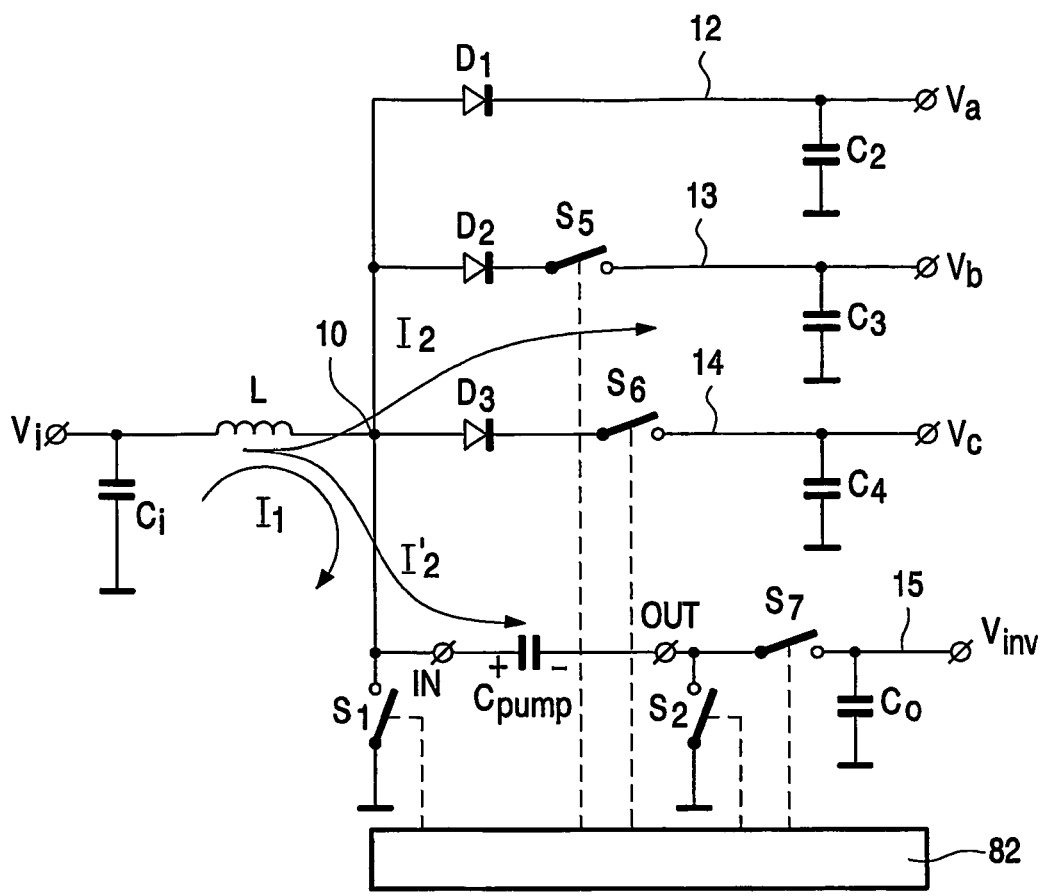
FIG. 6, shows a voltage converter comprising a capacitive DCDC inverter according to the present invention.

FIG. 1 demonstrates a prior art voltage converter that converts an input voltage $V_i$ into three clamp voltages $V_a, V_b$ and $V_c$. In FIG. 1, it is assumed that $V_a > V_b > V_c$. Resistors $R_{L1}$, $R_{L2}$ and $R_{L3}$ represent the loading of the voltage converter. The clamp voltages $V_a$, $V_b$ and $V_c$ are generated according to methods generally known in the art. For example, by controlling the duty-cycle of the inductive magnetizing and de-magnetizing mode in response to measuring clamp voltages $V_a$, $V_b$ and $V_c$ or by measuring the currents through the circuit loads $R_{L1}$, $R_{L2}$ and $R_{L3}$.

During the inductive magnetizing mode, switch $S_L$ is closed (conducting state) whilst D1,S5 and S6 are brought into a non-conducting state. Apparently, the magnetizing current $I_L$ equals $I_1$. It can easily be proven by those skilled in the art that $I_1$ equals $I_1=(V_i/L)*t$ wherein L represents the inductance of the inductor L and t represents time. Therefore, the magnetizing current $I_L$ will continuously increase with time up to $I_L$ equals Imax as is for example shown in curve 20 of FIG. 2. It can be easily proven that during the inductive magnetizing mode, current $I_L$ transfers an amount of energy E equal to $E=\frac{1}{2}*L*I^2max$ to the inductive circuit L.

During the inductive de-magnetizing mode, switch $S_L$ is opened whilst at the same time one of the switching elements D1, S5, S6 is brought into a conducting state. This way, the stored energy $E=\frac{1}{2}*L*I^2max$ is distributed over the output branches 12,13 or 14. By means of example, FIG. 1 assumes that only S5 is brought into a conducting state so that $I_L=I_2$. It is generally known in the art that inductor L resists to sudden current changes. It can therefore be easily proven that $I_2$ will start from Imax and will from thereon linearly decrease, as is shown in FIG. 2 curve 22. The angle α of the ramp 22 of FIG. 2 is determined by $L*dI_L/dt=(V_i-V_b+V_{D2})$ which means that the angle of the ramp 22 is primarily determined by the output voltage $V_b$.

$V_b$ can be expressed as $V_b=V_i-L*dI_L/dt+V_{D2}$. During the inductive de-magnetizing mode, the voltage across the inductor L of $L*dI_L/dt$ Volt will have a negative polarity, as is for example shown in FIG. 3 curve 32. It will however be apparent that $-L*dI_L/dt$ will have a positive contribution to the output voltage $V_b$. $V_{D2}$ represents the voltage drop across the diode D2 which typically lies typically between 0.3 and 0.7 Volts depending on the technology used. Diodes D1,D2 and D3 are applied to prevent current leakage from the outputs of the voltage converter towards the internal node 10. Diodes D1, D2 and D3 can be omitted in case switches S5, S6 are strictly uni-directional i.e. they conduct only from internal node 10 to the outputs. This is for example the case when the switches S5, S6 are constructed by means of a pair of P-mos transistors that are anti-serially coupled. It will be apparent that in this case branch 12 must also comprise a switch device. If switches S5 and S6 are opened, current $I_2$ will start flowing though branch 12. If switch S5 closed and S6 is left open, a voltage of $V_b-VD2$ will be imposed on internal node 10. Since this is a lower voltage than $V_a$, diode D1 will be turned off and $I_2$ will start flowing through the second branch 13. Likewise, closing S6 will impose a voltage of $V_c-V_{D3}$ on internal node 10 which will turn diodes D1 and D2 off. By operating switches $S_L$,S5 and S6 in a controlled manner it is thus possible to magnetize and de-magnetize the inductor L and to transfer the energy from inductor L to each one of the branches 12,13 and 14. Capacitor C1 acts as an DC input buffer that protects the input line against the high frequency switching input currents and the switching noise of the voltage converter. Capacitors C2, C3 and C4 serve as DC output buffers. Their function is firstly to smoothen the high frequency output currents and secondly, to assure a continuous output voltage during periods of time when no charge is provided to the branches of the voltage converter. As a consequence of this, the voltages across C2,C3 and C4 will show a slight AC ripple. However, this is of little consequence since capacitors C2,C3 and C4 are recharged fast enough by the inductive circuit.

FIG. 2 shows the magnetizing current $I_L$ flowing through inductor L. The rising edges 20 represent the charging or magnetizing of the inductor ($S_L$ is closed). During the inductive maximizing mode the magnetizing current $I_L$ increases until $S_L$ is opened. It can easily be proven that $I_L$ equals $V_i*t/L$ wherein t represents time and L is the inductance of the inductor L. Once $S_L$ is opened, current $I_L$ equals Imax and will exhibit a falling edge 22 as is shown in FIG. 2. It can be easily proven that this falling edge can be expressed as $dI_L/dt=(V_i-Vout+V_D)/L$ wherein $V_i$ represents the input voltage. Vout represents any of the output voltages $V_a$, $V_b$, $V_c$ of FIG. 1, $V_D$ represents the voltage drop across diodes D1,D2 and D3. when the diodes are in a conducting state.

FIG. 3 shows the voltage drop $U_L$ across inductor L which can be expressed as $U_L=L*dI_L/dt$. This results in a positive polarity 30 of the voltage $U_L$ during the rising edges 20 of $I_L$ and a negative polarity 32 of the voltage $U_L$ during the falling edges 22 of $I_L$.

FIG. 4 shows a DCDC capacitive voltage inverter. Shown is a capacitor Cpump that is charged through an input voltage source $V_i$. During the charging, switches S4 and S2 are closed whilst switches $S_L$ and S7 are opened. Through this, Cpump will be charged until the voltage drop across Cpump corresponds to $V_i$ and is having a polarity as shown in FIG. 4. Once Cpump is fully charged, switches S4 and S2 are finally opened and switches $S_L$ and S7 are closed. Because of this, Cpump is coupled to the output capacitive voltage inverter to deliver an output voltage Vinv that is having the same magnitude as $V_i$ but is having an opposite polarity. Capacitor Co is a DC output buffer that smoothens the high frequency output current of the converter and to provide the output voltage Vinv to the load of the capacitive DCDC inverter when the pump capacitor Cpump is recharged.

FIG. 5, shows the combination of the prior art DCDC voltage converter as shown in FIG. 1 and the capacitive DCDC voltage inverter as discussed in FIG. 4. Capacitor Cpump is coupled to the outputs of branches 12, 13 and 14 by means of switches S4, S'4 and S"4 that are operated in an alternate fashion. By closing e.g. switches S4 and S2, pump capacitor Cpump is charged with voltage $V_c$. By closing S7 and S1 and opening S4, S'4, S"4 and S2 the output voltage Vinv becomes equal to $-V_c$.

FIG. 6, shows a DCDC voltage converter according to the present invention. Shown is a capacitive DCDC inverter that is coupled to the internal node 10. Through this Cpump is charged with the voltage available at node 10 during the inductive de-magnetizing mode. As previously discussed, this voltage is determined by the input voltage Vi and the voltage drop across inductor L. Apparently, the voltage drop across the inductor is determined by the currents I2 and I'2 that are drawn from it during the de-magnetizing mode. It will be apparent to those skilled in the art that through this, the output voltage Vinv can have a substantially equal magnitude than any one of the clamp voltages $V_a$, $V_b$ or $V_c$ depending on which of the non-inverting branches 12,13 or 14 is activated. By providing control means (82), the duty cycle of the switches S1, S2, S5, S6, S7 can be controlled in order to influence the behavior of the voltage converter. This embodiment provides the advantage that only a limited amount of extra switches are required i.e. S6 and S7 which makes the circuit much easier to integrate at lower costs and less requirements for the control of the switches.

Figure 7:
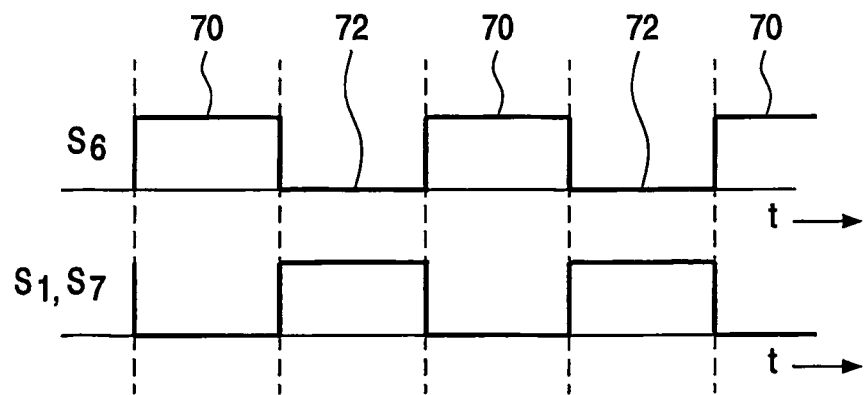
FIG. 7, shows a switching sequence a voltage converter comprising a capacitive DCDC inverter according to the present invention.

FIG. 7 shows, by means of example, switching cycles for controlling the switches S1, S6 and S7 of FIG. 6. It is assumed that energy is provided to the non-inverting branch 14 (deliver on demand) and to the non-inverting branch. This means that switches S5 and S2 are closed and S6 and S7 are left open. It will be apparent to those skilled in the art that the voltage level at node 10, will substantially correspond to the clamp voltage $V_b$. This means, that the voltage across Cpump will become $V_b$ as well. During the next inductive magnetizing mode 72, switches S1 and S7 are closed such that current $I_1$ will start flowing for charging inductor L with energy whilst the output voltage of the inverting branch Vinv will become $-V_b$. Once Cpump is coupled to the output of the inverting branch it will be apparent that the voltage across the capacitor Cpump will somewhat decrease. Therefore, during the next inductive de-magnetizing mode, S1 and S7 are re-opened and S6 is closed. This allows Cpump to be replenished with energy such that again a voltage drop of $V_b$ Volts will be across the capacitor Cpump.

Figure 8:
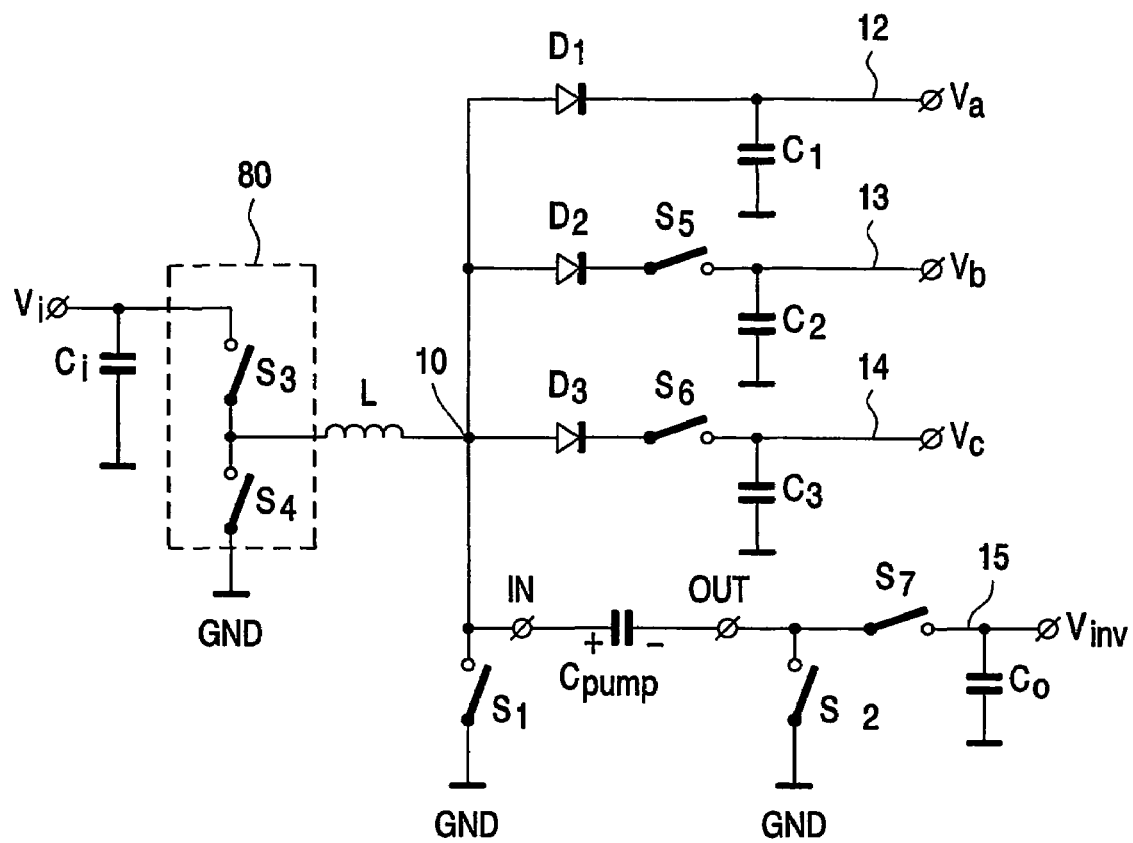
FIG. 8, shows another voltage converter according to an embodiment of the invention that comprises input voltage reduction means.

FIG. 8, shows a DCDC voltage converter wherein by means of switches S3 and S4, alternately a ground voltage GND and an input voltage $V_i$ are coupled to the inductor L. for reducing the average value of the input voltage $V_i$. It will be apparent to those skilled in the art that a reduction of the input value can advantageously be used to influence the output voltages of the DCDC voltage converter.

It is to be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The invention claimed is:

1. A voltage converter comprising:
    an inductive circuit for storing energy during an inductive magnetizing mode and transferring energy during an inductive de-magnetizing mode;
    at least two non-inverting branches for providing at least two non-inverted output voltages and
    an inverting branch for providing an inverted output voltage;
    the inverting and non-inverting branches being parallely coupled to an output of the inductive circuit the inductive circuit being arranged to transfer energy to the inverting branch and to one of the at least two non-inverting branches that is activated, wherein the inverted voltage and the corresponding non-inverted output voltage of the one of the at least two non-inverting branches have an opposite polarity and a substantially equal magnitude; and
    wherein said magnitude is determined by the selection of the one non-inverting branch that is activated.

2. The voltage converter according to claim 1, wherein the inverting branch comprises a capacitive circuit for storing the energy that is transferred during the inductive de-magnetizing mode and for releasing the transferred energy during the inductive magnetizing mode.

3. The voltage converter according to claim 2, wherein the capacitive circuit is arranged to receive the transferred energy through an input of the capacitive circuit while an output of the capacitive circuit is coupled to a ground voltage and wherein the capacitive circuit is further being arranged to release energy through the output while the input is coupled to the ground voltage.

4. The voltage converter according to claim 3, comprising first and second switch devices for respectively coupling the input and the output of the capacitive circuit to the ground voltage during respectively the inductive magnetizing and de-magnetizing mode.

5. The voltage converter according to claim 1, wherein the voltage converter further comprises a voltage down conversion circuit through which an input voltage is applied to the inductive circuit.

6. The voltage converter according to claim 5, wherein the voltage down-conversion circuit comprises third and fourth switch devices for alternately applying the input voltage and a ground voltage to the inductive circuit.

7. The voltage converter according to claim 1, wherein at least one of the at least two branches comprises a further switch device for activating the branch.

8. The voltage converter according to claim 1, wherein the voltage converter further comprises control means for controlling the switch devices.

9. A power management unit comprising a voltage converter according to claim 1.

10. A mobile device comprising a power management unit according to claim 9.

* * * * *